United States Patent
Van Pelt et al.

(10) Patent No.: US 7,786,391 B1
(45) Date of Patent: Aug. 31, 2010

(54) BALLAST HOUSING HAVING ROLLED EDGE LEAD WIRE EXIT

(75) Inventors: James Van Pelt, Schaumburg, IL (US); JC Kelley, Owens Crossroads, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 1056 days.

(21) Appl. No.: 11/481,143

(22) Filed: Jul. 5, 2006

Related U.S. Application Data

(66) Substitute for application No. 60/740,316, filed on Nov. 29, 2005.

(51) Int. Cl.
*H02G 3/18* (2006.01)
(52) U.S. Cl. ........................ 174/659; 174/650; 174/655; 174/50; 439/535; 277/606; 16/2.1
(58) Field of Classification Search ......... 174/650–669, 174/64, 151, 135, 50; 16/2.1, 2.2; 248/56; 439/604, 535; 277/606; 220/4.02
See application file for complete search history.

(56) References Cited

U.S. PATENT DOCUMENTS

| | | | | |
|---|---|---|---|---|
| 2,511,524 A | * | 6/1950 | Adler | ........................ 333/124 |
| 4,533,201 A | * | 8/1985 | Wasserlein, Jr. | ............. 439/404 |
| 6,457,843 B1 | * | 10/2002 | Kester et al. | ................. 362/276 |
| 7,282,650 B2 | * | 10/2007 | Czuhanich et al. | .......... 174/659 |

* cited by examiner

*Primary Examiner*—Dhiru R Patel
(74) *Attorney, Agent, or Firm*—Waddey & Patterson; Mark J. Patterson

(57) ABSTRACT

A ballast housing having a rolled edge lead wire exit for providing protection and strain relief to lead wires extending out from the housing. Grommets are not required in order to provide protection and strain relief to lead wires exiting the housing. The housing includes a lead wire opening having rolled upper and lower edges. The housing includes a lid including the rolled upper edge and a can including the rolled lower edge. The rolled upper edge is vertically aligned with the rolled lower edge but horizontally misaligned with the rolled lower edge. As a result, the rolled upper edge is positioned away from the rolled lower edge a distance that is horizontally shorter than the diameter of the lead wire. Additionally, the lead wire opening has a vertical diameter that is shorter than the diameter of the lead wire.

22 Claims, 9 Drawing Sheets

BALLAST HOUSING HAVING ROLLED EDGE LEAD WIRE EXIT

CROSS-REFERENCES TO RELATED APPLICATIONS

This application is a Non-Provisional Utility application which claims benefit of co-pending U.S. Provisional Patent Application Ser. No. 60/740,316 filed Nov. 29, 2005, entitled "Rolled Edge Exit for Lead Wires in Metal Ballast Housing," which is hereby incorporated by reference.

All other patents, patent applications, and publications described or discussed herein are also hereby incorporated by reference in their entirety.

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

The present invention relates generally to ballast housings. More particularly the current invention relates to a ballast housing having a rolled edge lead wire exit.

Ballast housings are well known in the art. An example of a typical prior art ballast housing is shown in FIG. 1. These housings are normally composed of metal and have lead wire exit holes that are used to feed lead wires from the electronic components inside the ballast housing to external devices, such as an AC power source. Lead wire exit holes typically have sharp edges that can cut or damage lead wires, which are normally insulated for safety and efficiency, extending through the lead wire exit holes. If this occurs, the electronic components inside the ballast housing may malfunction and become unsafe.

As seen in FIGS. 1 and 2, prior attempts to alleviate these safety and functional problems have included the use of a grommet for strain-relief and protection of wires extending from housings. It is common throughout the ballasts industry to use custom molded grommets made out of soft plastic, rubber or similar material. These grommets are pressed into stamped openings in the housing of the base, or can, of the ballast. Wires, such as lead wires, are then routed through top slits in the grommets, which are then subsequently closed when the housing lid is assembled onto the can.

The use of grommets has several disadvantages. For example, the grommets normally must be custom molded to fit each opening in the ballast. Increased labor and material costs are associated with the production and installation of the grommets used in each opening of the ballasts. The required position of the grommets can result in injuries to the assembler by the metal edges on the ballast openings as well as the potential for carpal tunnel syndrome through repeated installation of the grommets.

What is needed, then, is a ballast housing that protects and provides strain relief to lead wires exiting the housing and that eliminates the disadvantages associated with existing prior art ballast housings.

BRIEF SUMMARY OF THE INVENTION

Accordingly, one object of the present invention is to provide a ballast housing that protects and provides strain relief to lead wires exiting the housing.

Another object of the present invention is to provide a ballast housing that eliminates the disadvantages associated with existing prior art ballast housings.

Still another object of the present invention is to provide a ballast housing that eliminates the need for grommets to protect and provide strain relief for lead wires extending from the housing.

These, and other objects, features and advantages of the present invention, which will be readily apparent to those skilled in the art upon reading of the following disclosure, are satisfied by the present invention of a ballast housing having a rolled edge lead wire exit.

The housing comprises a lead wire opening that provides compression to, and strain relief for, a lead wire passing through the lead wire opening. The lead wire opening includes a rolled upper edge and rolled lower edge. The rolled upper edge is horizontally misaligned with the rolled lower edge. As a result, the rolled upper edge is positioned away from the rolled lower edge a distance that is horizontally shorter than the diameter of the lead wire. Additionally, the lead wire opening has a vertical distance that is shorter than the diameter of the lead wire.

The housing can also include a lid connected to a can. The rolled upper edge can be part of a u-shaped indentation in the lid and the rolled lower edge can be part of a u-shaped indentation in the can.

The lid and can of the ballast housing can each be described as having a continuous hem defining a window in the lid and can, respectfully. The lid and can be connected so that the continuous hem in the lid is aligned with and overlaps the continuous hem in the can. The continuous hems in the lid and can compress and provide strain relief for a lead wire passing through the opening formed by the continuous hems.

The continuous hem in the lid can be positioned above and vertically aligned with the continuous hem in the can. Additionally, the continuous hem in the lid can be horizontally displaced from the continuous hem in the can by a distance that is shorter than the thickness of the lead wire.

In an alternate embodiment, the lid is a plastic lid having a lid end panel and a snap tab, wherein the lid end panel includes an edge having a rounded corner and a strengthening rib. The can includes a can end panel and a snap tab opening, wherein the can end panel includes a u-shaped rolled edge aperture. The plastic lid is connected to the can so that the lid end panel overlaps the can lid panel. When so positioned, the rounded corner and u-shaped rolled edge aperture compress and provide strain relief to a lead wire passing through a lead wire window in the housing. The lead wire window is formed by the rounded corner and the u-shaped rolled edge aperture. The snap tab is engaged by the snap tab opening to facilitate securement of the lid to the can.

Also included herein is an improved exit for wires extending from electronic devices, such as ballasts. The ballast includes a top and a container with at least one wire extending from the ballast. The top includes a top internal portion and at least one top wire aperture defined by a top crease, a top edge, and a top engaging surface. The top engaging surface extends from the top crease to the top edge, while the top edge is turned towards the top internal portion. The container includes a container internal portion and at least one container wire aperture defined by a container crease, a container edge, and a container engaging surface. The container engaging surface extends from the container crease to the container edge. The container edge is turned towards the container internal portion.

Additionally, the at least one top wire aperture can be vertically and horizontally offset with respect to the at least one container wire aperture when the top is positioned on the container. When so positioned, the top engaging surface and the container engaging surface are in direct contact with the wire and apply a compressive force to the wire positioned in the apertures. The top wire aperture and the container wire aperture can be separated by a vertical and horizontal distance such that the vertical distance is less than the thickness of the wire extending from the ballast. Additionally, the horizontal distance can be less than the thickness of the wire. This relationship facilitates the engaging surfaces being in direct contact with the wire and protects the connection of the wire to the internal elements of the ballast.

In one embodiment, the wire apertures are arcuate in shape and the top and container are composed of metal. Alternately, the top and container can be composed of plastic-like material. When composed of plastic-like material, the top can include a biasing closure and at least one support rib positioned proximate to the top wire aperture for support. The biasing closure can engage a closure opening in the container to secure the top to the container.

DETAILED DESCRIPTION OF THE INVENTION

Figure 9A:
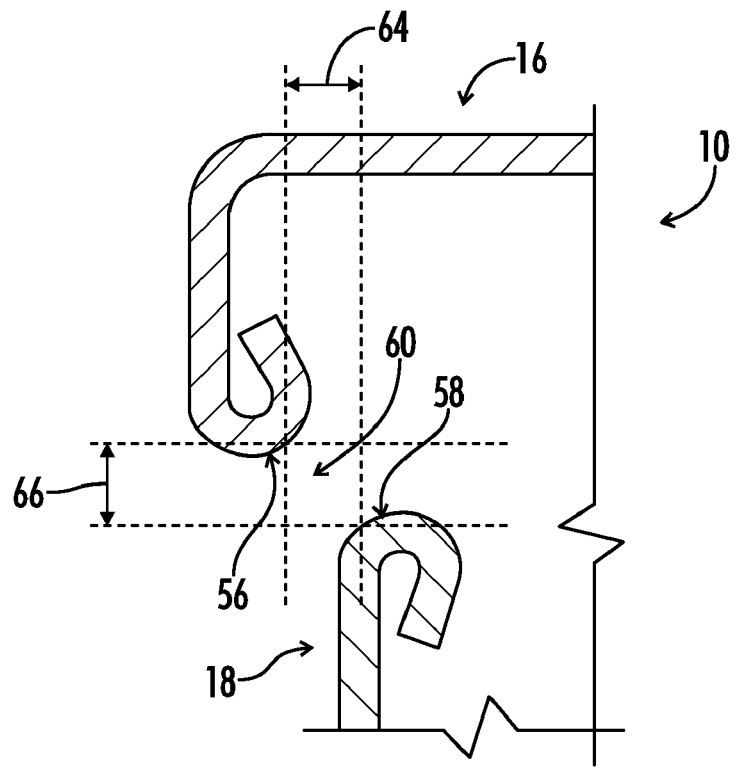
FIG. 9A is a partial cross sectional view of a ballast housing in accordance with the current disclosure.
Figure 9B:
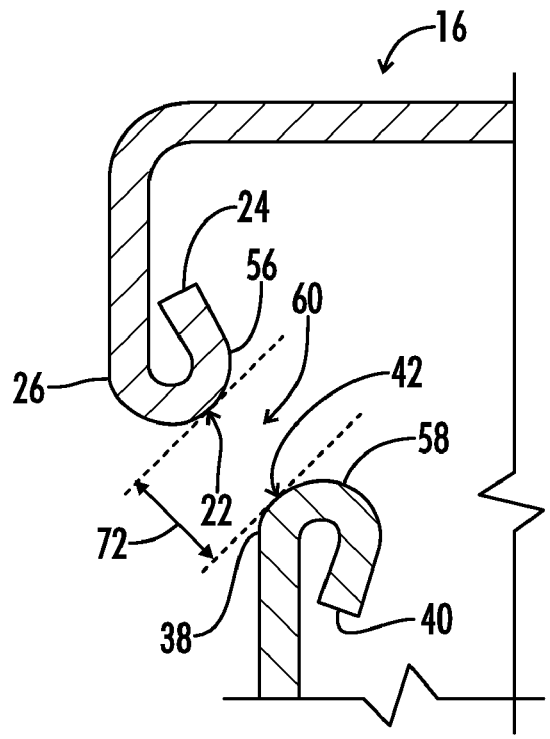
FIG. 9B is a partial cross sectional view of the ballast housing of FIG. 9A.

Referring generally now to the Figures, a ballast housing is shown and generally designated by the numeral 10. The ballast housing can include a wire 12, or wires 13 and 14, extending from the ballast housing 10. The wires 13 and 14 or 12 can be combinations of single or double wires known in the art to extend from electronic devices, such as a ballast 100. The ballast housing 10 includes a lid 16 and a can 18. In one embodiment, shown in FIG. 9A, a ballast housing 10 includes a lead wire opening 60 between the lid 16 and the can 18. The lead wire opening 60 in the housing 10 includes a rolled upper edge 56 and a rolled lower edge 58. The lead wire 12, not shown, passes through the lead wire opening 60 between the rolled upper edge 56 and the rolled lower edge 58. In one embodiment, the rolled upper edge 56 is horizontally misaligned from the rolled lower edge 58 by a horizontal distance 64, as seen in FIG. 9A. The horizontal distance 64 is typically less than the diameter of the lead wire 12. Additionally, the vertical distance 66 between the rolled upper edge 56 and the rolled lower edge 58, seen in FIG. 9A, is less than the diameter of the lead wire 12. In one embodiment, seen in FIG. 9B, the lead wire opening 60 includes a lead wire opening dimension 72 that is less than the diameter of the lead wire 12. The lead wire opening 60 may provide both compression to and strain relief for the lead wire 12 passing through the lead wire opening 60. In one embodiment, the rolled upper edge 56 is part of a u-shaped indentation located on the lid 16. Similarly, in one embodiment, the lower rolled edge 58 is part of a u-shaped indentation located in the can 18.

Figure 4:
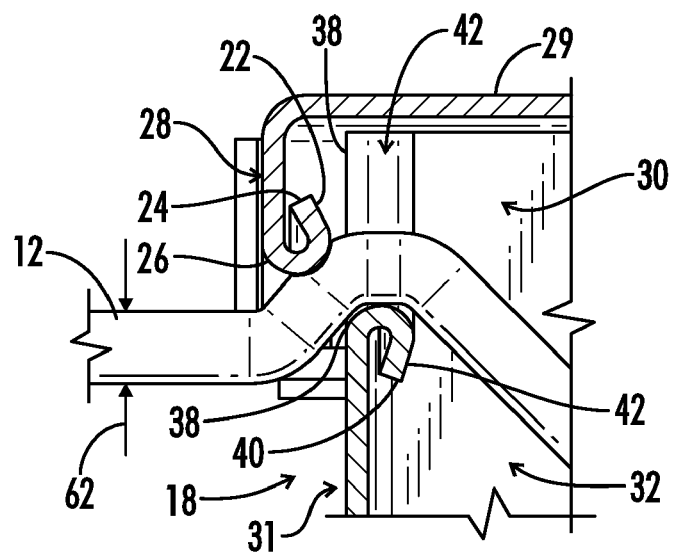
FIG. 4 is a partial cross sectional view showing detail of a lid and container made in accordance with the current disclosure.
Figure 5:
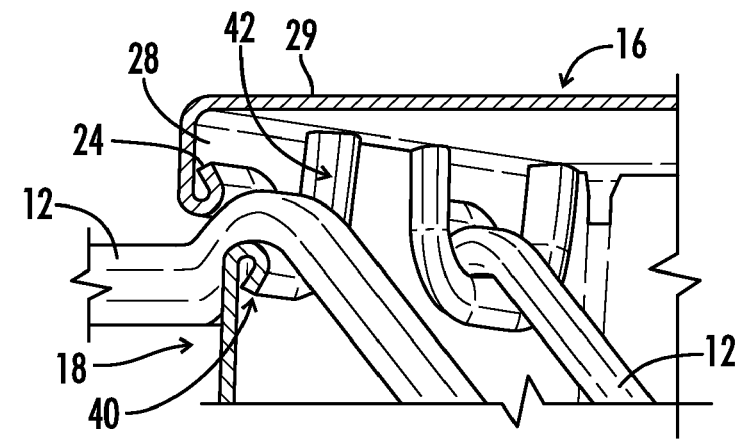
FIG. 5 is a partial internal perspective view showing a lid and container made in accordance with the current disclosure.
Figure 11:
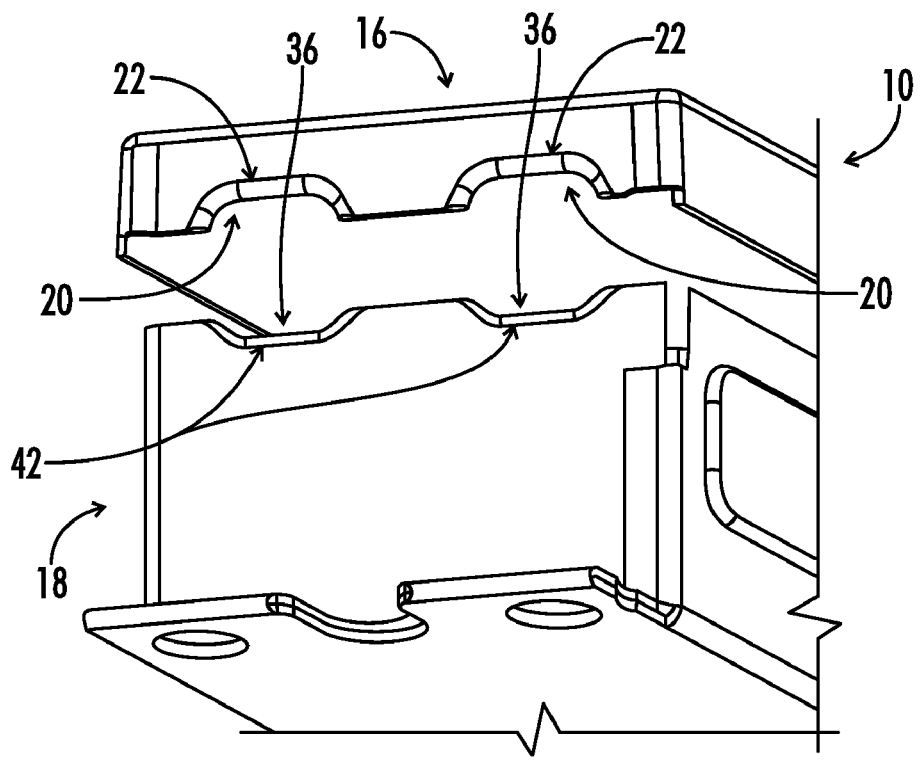
FIG. 11 is a partial perspective view of a ballast housing in accordance with the present invention.

The lid 16, which can also be described as a top 116, includes a lid wire aperture 20 defined by a lid engaging surface 22, seen in FIG. 11. The lid engaging surface 22 extends from a lid edge 24 to a lid crease 26, seen in FIG. 9B. The lid crease 26 can be generally described as being substantially positioned near the start of the curvature of the lid engaging surface 22 from the lid wall 28, as seen in FIG. 4. The lid edge 24 is turned toward the lid internal portion 30, which can be generally described as the internal cavity formed by the lid walls 28 and the top lid plate 29. The lid edge 24 can be further turned towards the lid wall 28, which can also be described as a lid support wall 28.

The can 18, which can also be described as a container 18, includes a can internal portion 32, which can be described as the cavity formed by the can walls 31 and can bottom plate 34. A can wire aperture 36 is positioned in one of the can walls 31 and is defined by a can crease 38, can edge 40 and can engaging surface 42. The can engaging surface 42, which can also be described as a second curved engaging surface, extends from the can crease 38 to the can edge 40. The can edge 40 is turned towards the can internal portion 32 and can be further turned towards the can wall 31, which can also be described as a can support wall 31. The can crease 38 can be generally described as being substantially positioned near the start of the curvature away from the can wall 31.

In one embodiment, the lid wire aperture 20, seen in FIG. 11, is vertically and horizontally offset with respect to the can wire aperture 36 when the lid 16 is positioned on the can 18. In this configuration, the lid wire aperture and the can wire aperture 36 apply a compressive force to the wire 12, 13, or 14 positioned within the apertures 20 and 36. Additionally, in this position the engaging surfaces 22 and 42 are in direct contact with the wire 12, 13, or 14. The apertures 20 and 36 can be separated by both a horizontal and vertical distance.

The thickness of the wire 12, 13, or 14 positioned between the apertures 20 and 36 can be such that the vertical distance between these apertures is less than the thickness of the wire 12, 13, or 14. Additionally, the horizontal distance between the apertures 20 and 36 can also be less than the thickness of the wire 12, 13, or 14. This space configuration facilitates the compressive force placed on the wires 12, 13, or 14 by the engaging surfaces 22 and 42.

Figure 1:
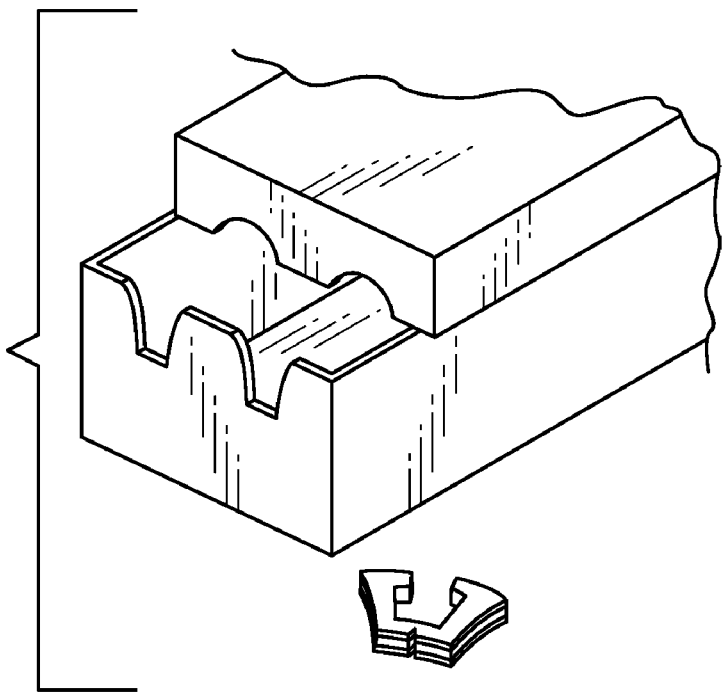
FIG. 1 is a partial perspective view of a prior art ballast housing with a grommet positioned beside it.
Figure 2:
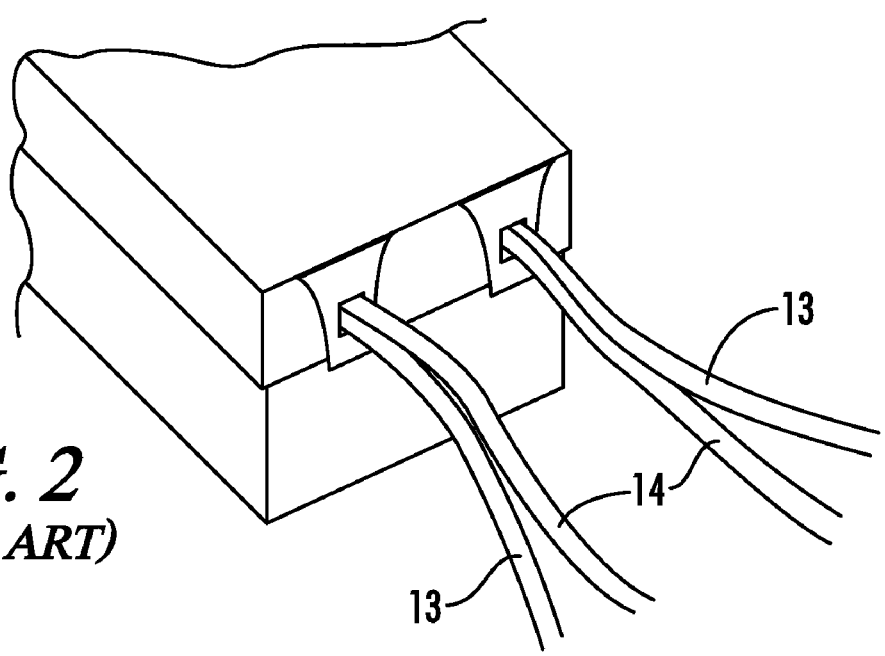
FIG. 2 is a partial perspective view of a prior art ballast housing having multiple grommets and wires extending through the grommets.
Figure 3:
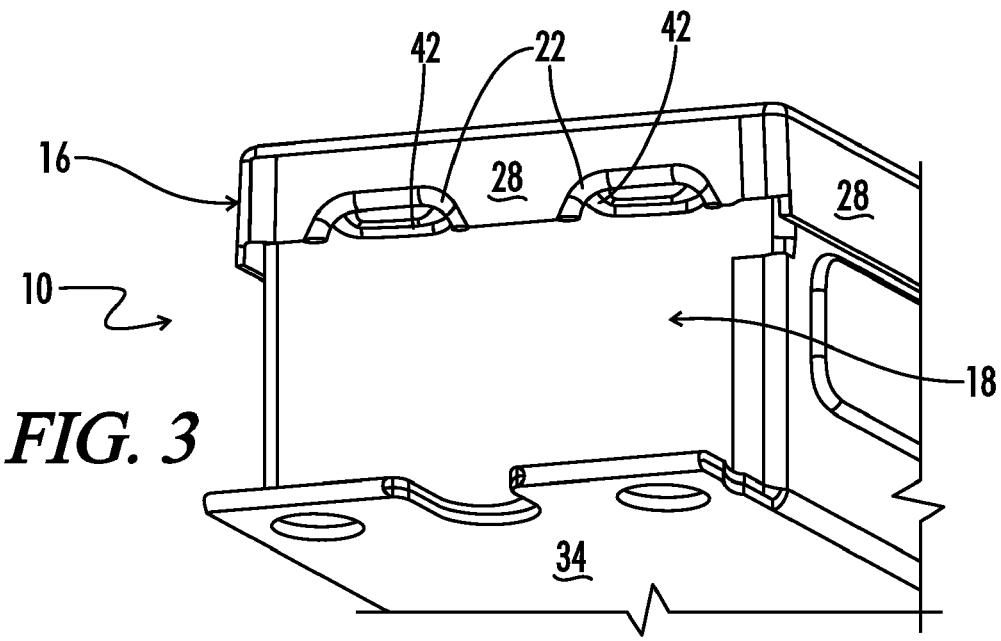
FIG. 3 is a partial perspective end view of a ballast housing made in accordance with the current disclosure.
Figure 10A:
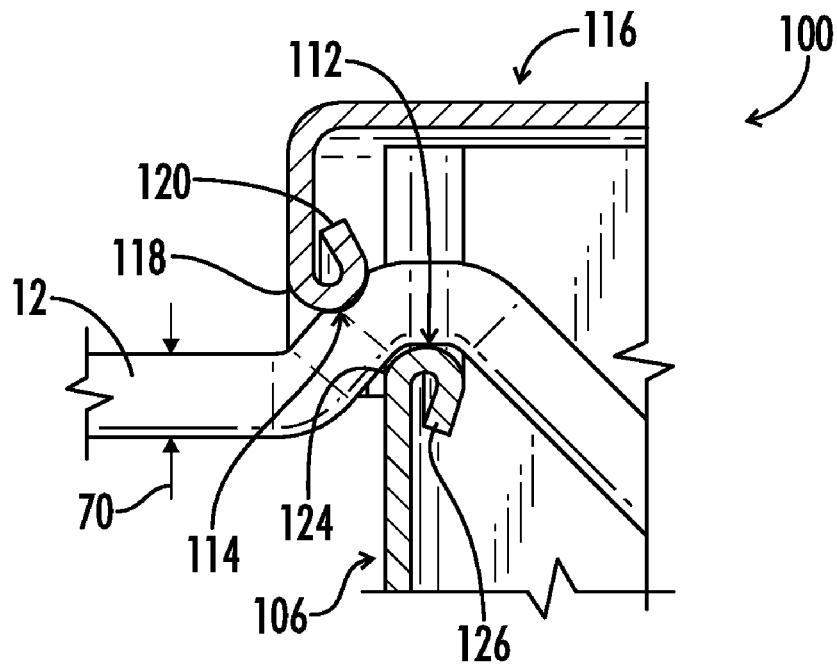
FIG. 10A is a partial cross sectional view of a ballast housing in accordance with the current disclosure.
Figure 10B:
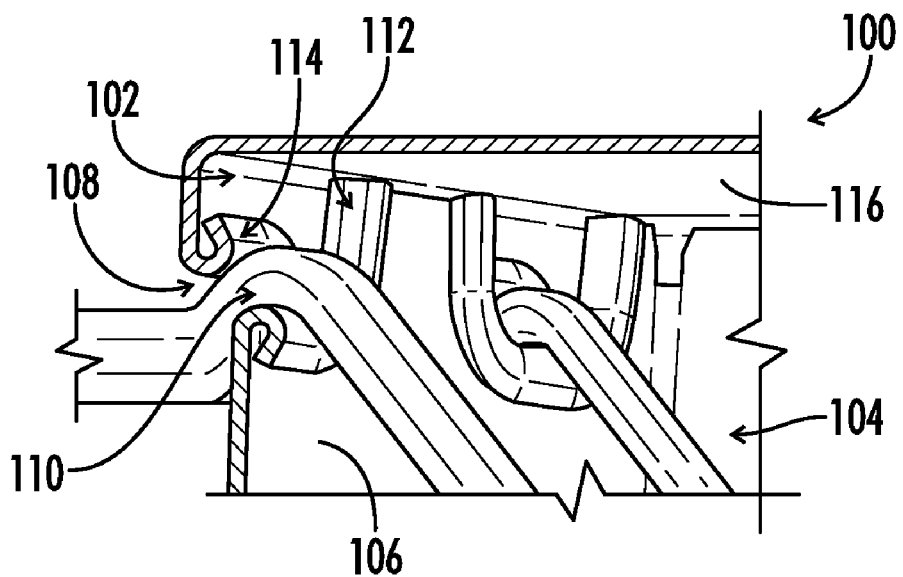
FIG. 10B is a partial perspective view of the ballast housing of FIG. 10A.
Figure 10C:
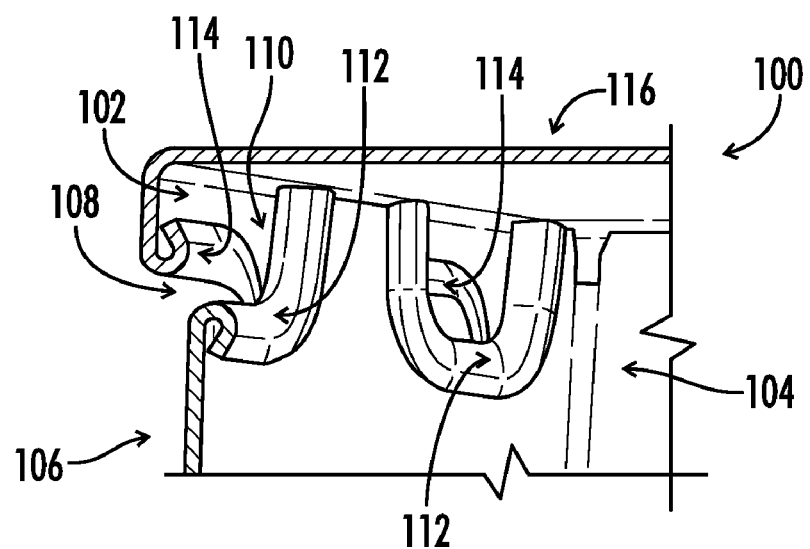
FIG. 10C is a partial perspective view of the ballast housing of FIG. 10A.
Figure 10D:
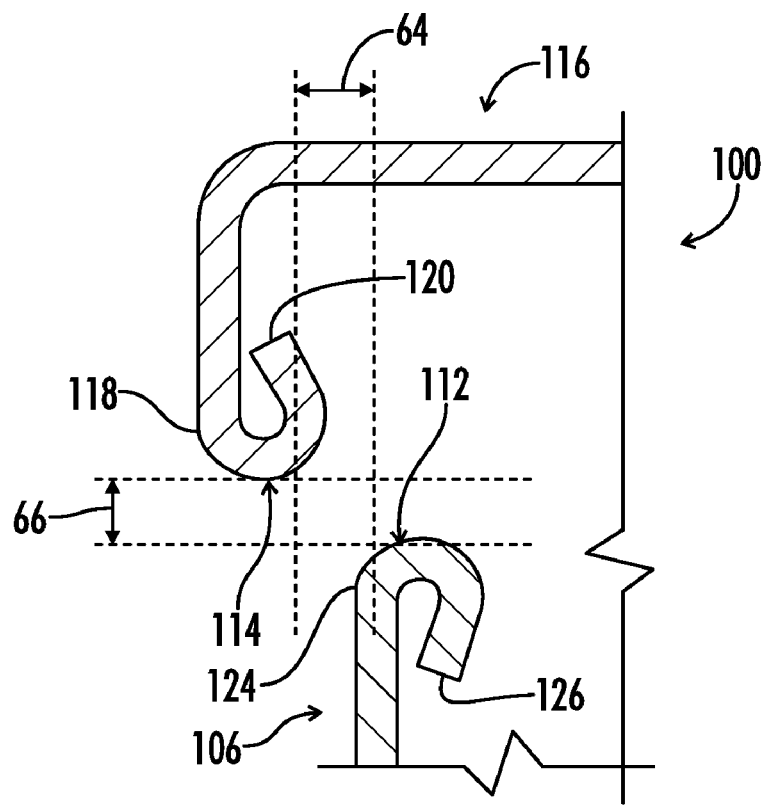
FIG. 10D is a partial cross sectional view of a ballast housing in accordance with the present invention.

Referring now to FIG. 10A, in one embodiment, a ballast 100 includes at least one wire 12 extending from the ballast 100. The ballast 100 includes a top 116 and a container 106. The top 116 includes a top wire aperture 108, shown in FIG. 10B. The top wire aperture 108 is defined by a top crease 118, a top edge 120 and a first curved engaging surface 114 extending between the top crease 118 and the top edge 120. The top edge 120 is bent toward the top internal portion 102. The container 106 includes a container internal portion 104 and a container wire aperture 110. The container wire aperture 110 is defined by a container crease 124, a container edge 126 and a second curved engaging surface 112 extending between the container crease 124 and the container edge 126. The container edge 126 is generally bent inward toward the container internal portion 104. In one embodiment, shown in FIGS. 10A and 10B, the top wire aperture 108 is both vertically and horizontally offset from the container wire aperture 110 when the top 116 is positioned on the container 106. As such, both the first curved engaging surface 112 and the second curved engaging surface 112 apply a compressive force to the wire 12 positioned in the apertures 108, 110. In one embodiment, the engaging surfaces 114, 112 are both in direct contact with the wire 12. In another embodiment, the wire 12 includes a thickness 70. The apertures 108, 110 are separated by a vertical distance 66 and a horizontal distance 64, seen in FIGS. 10C and 10D. In one embodiment, the horizontal distance 64 is less than the thickness 70 of the wire 12. In another embodiment, both the horizontal distance 64 and the vertical distance 66 are less than the thickness 70 of the wire 12. Also, in one embodiment, the top 116 and the container 106 are composed of metal. In one embodiment both the lid 16 and can 18 are composed of metal, as shown in FIGS. 3-4. The lid 16 and can 18 can be fastened together in conventional manners known in the art.

Figure 6:
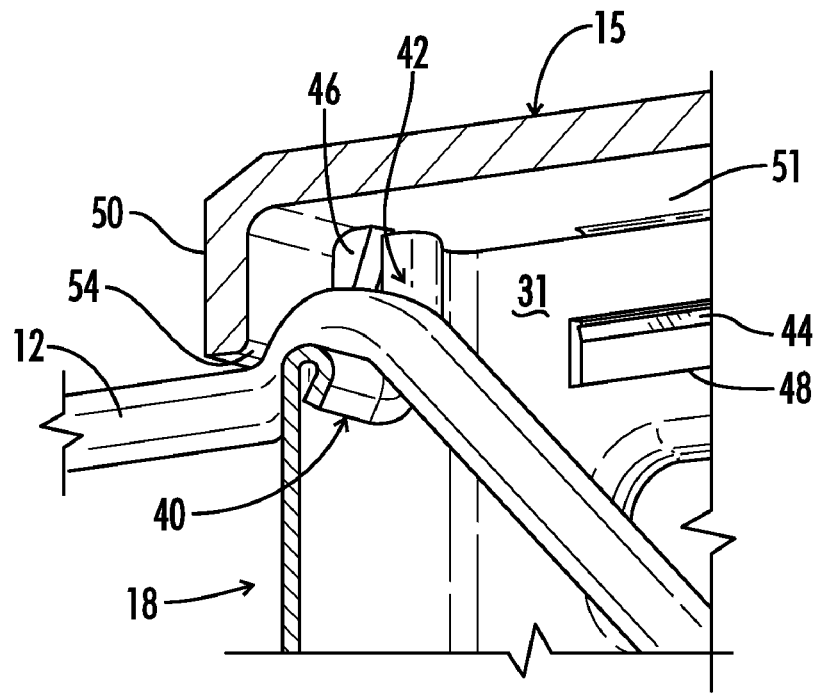
FIG. 6 is a partial internal cross sectional view of an alternate lid and container made in accordance with the current disclosure.
Figure 7:
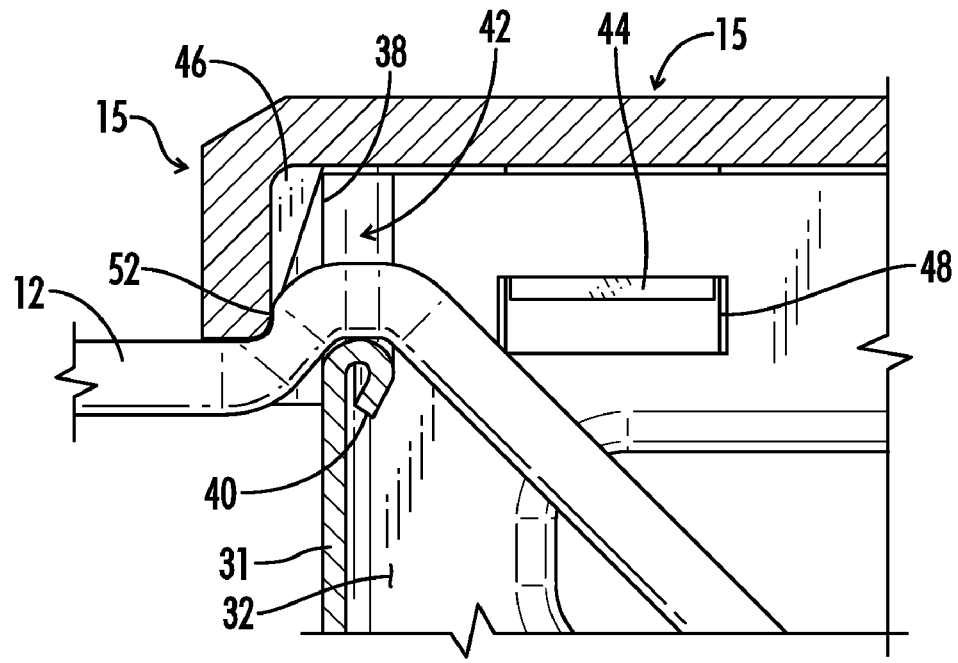
FIG. 7 is a partial internal cross sectional view of an alternate lid and container made in accordance with the current disclosure.

In an alternate embodiment, the lid 15 is composed of plastic as shown in FIGS. 6-7. The lid can include a biasing closure 44, and a support rib 46. The biasing closure 44 can be shaped and positioned to correspond to a closure opening 48, positioned on the can 18 to accept the biasing closure 44 to secure the lid 15 to the can 18. In another embodiment, a ballast 100 includes a top 116 made of plastic and including at least one biasing closure 44 and at least one support rib 46. The support rib 46 is generally positioned proximate to the top wire aperture 108. Also, in one embodiment, the container 106 includes at least one closure opening 48. The closure opening 48 resiliently engages the biasing closure 44 to secure the top 116 to the container 106.

The support rib 46 can be positioned to engage the lid walls 50 and top lid plate 51 of the lid 15 to facilitate support of the lid structure 15. The support rib 46 can preferably be positioned proximate to the wire aperture 52 to facilitate support thereof. The wire aperture 52 can include a curve engaging surface 54 that interacts with the curve engaging surface 42 of a can 18 to facilitate compression and securement of the wires 12, 13, or 14 positioned in the apertures 52 and 36.

Figure 8A:
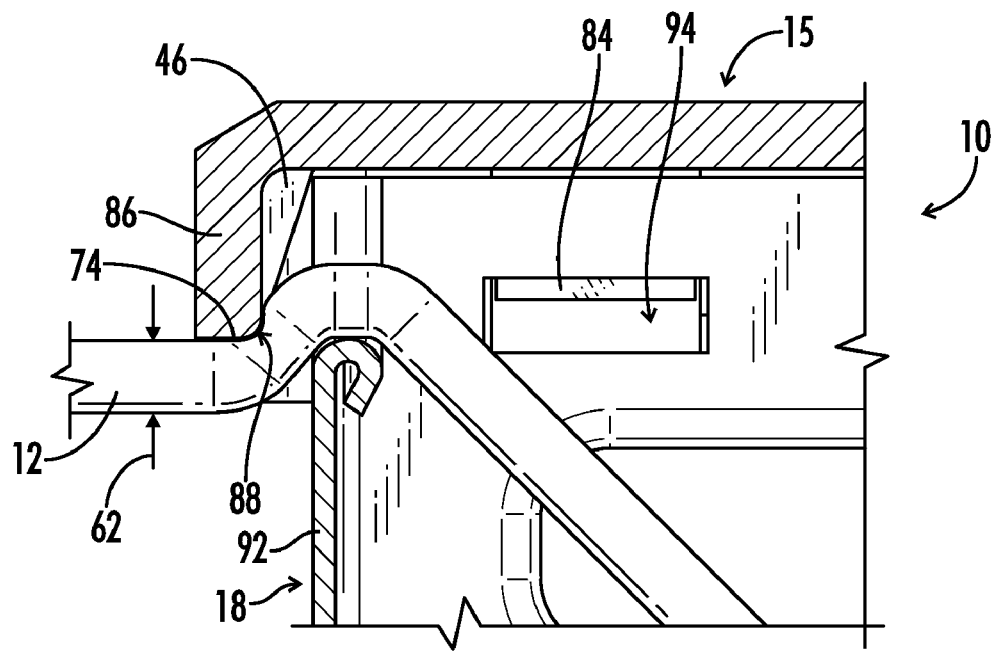
FIG. 8A is a partial cross sectional view of a ballast housing in accordance with the current disclosure.
Figure 8B:
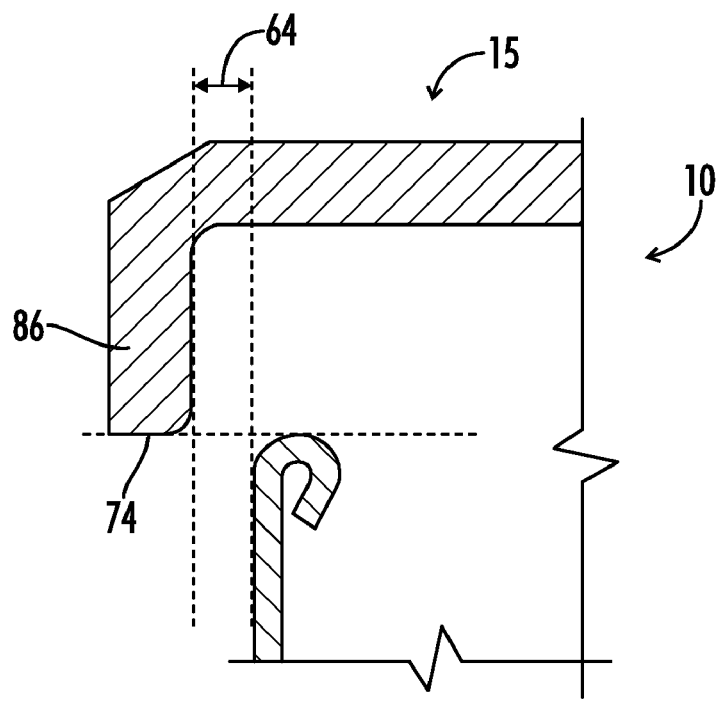
FIG. 8B is a partial cross sectional view of a ballast housing in accordance with the current disclosure.
Figure 8C:
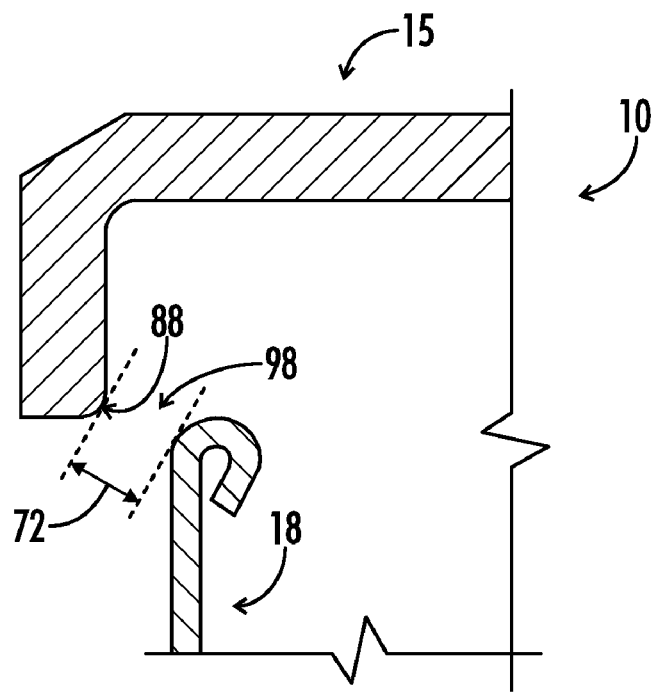
FIG. 8C is a partial cross sectional view of the ballast housing of FIG. 8B.
Figure 8D:
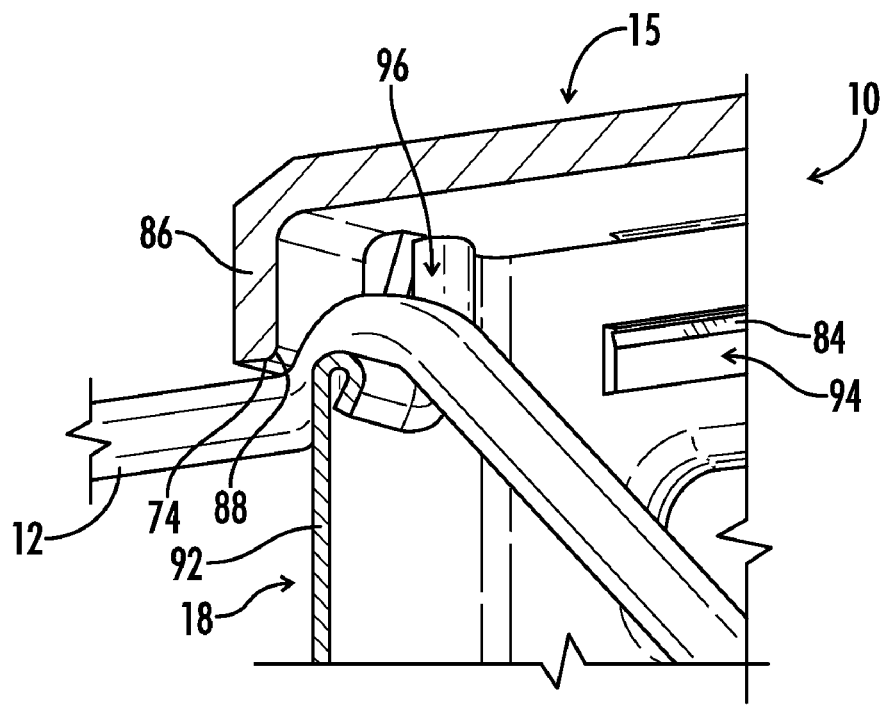
FIG. 8D is a partial perspective view of the ballast housing of FIG. 8A.

Alternately, the can 18 can also be composed of plastic without substantially deviating from the inventive nature of this disclosure. In one embodiment, shown in FIG. 8A, a ballast housing 10 includes a plastic lid 15 having a lid end panel 86. The plastic lid 15 includes a snap tab 84 which resiliently engages a snap tab opening 94, located on the can 18, to secure the plastic lid 15 to the can 18. The lid end panel 86 further includes an edge 74 having a rounded corner 88. The lid end panel 86 also includes a support rib 46 extending therefrom. Also shown in FIG. 8A, the can 18 includes a can end panel 92 having a u-shaped rolled edge aperture 96, seen in FIG. 8D. The u-shaped rolled edge aperture 96 of the can 18 and the rounded corner 88 of the plastic lid 15 form a lead wire window 98, shown generally in FIG. 8C. The lead wire window 98 generally has a dimension 72 smaller than the diameter of the lead wire 12 so that the rounded corner 88 and the u-shaped rolled edge aperture 96 provide compression to the region of the lead wire 12 passing through the lead wire window 98. As such, the lead wire window 98 also provides mechanical strain relief to the lead wire 12 in the ballast housing 10 by reducing the strain felt by the lead wire 12 positioned inside the ballast housing 10 when force is applied to the region of the lead wire 12 extending outside the ballast housing 10. In one embodiment, the ballast housing 10 is made of injection molded plastic. In one embodiment, shown in FIG. 8B, the plastic lid 15 is offset from the can 18 by a horizontal distance 64. The horizontal distance 64 can be less than the lead wire diameter 62, seen in FIG. 8A.

Figure 12:
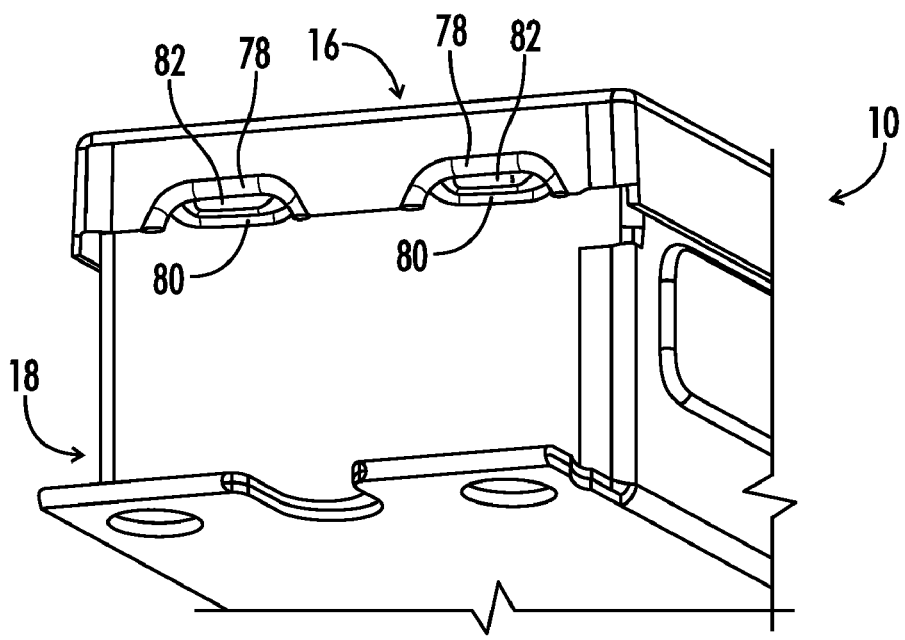
FIG. 12 is a partial perspective view of a ballast housing in accordance with the present invention.

The apertures 20 and 36 can also be described as having a rolled edge, which can be generally described as including the engaging surfaces 22 and 42. The rolled edges can also be described as having a continuous hem positioned in the apertures 20 and 36. In one embodiment, shown in FIG. 12, the ballast housing 10 includes a lid 16 having a first continuous hem 78 defining a first window in the lid 16. The ballast housing 10 also includes a can 18 having a second continuous hem 80 defining a second window in the can 18. In one embodiment, the lid 16 is connected to the can 18 and the first continuous hem 78 is aligned with and overlaps the second continuous hem 80. A lead wire 12, not shown, passes through the opening 82 defined by the space between the first continuous hem 78 and the second continuous hem 80.

Thus, although there have been described particular embodiments of the present invention of a new and useful Ballast Housing Having Rolled Edge Lead Wire Exit, it is not intended that such references be construed as limitations upon the scope of this invention except as set forth in the following claims.

The invention claimed is:

1. A housing for an electronic ballast, comprising:
   a can and a lid and a lead wire opening adapted to provide compression to, and strain relief for, a lead wire having a diameter passing through the lead wire opening, the lead wire opening including a rolled upper edge and a rolled lower edge, the rolled upper edge horizontally misaligned with the rolled lower edge so that the rolled upper edge is horizontally positioned away from the rolled lower edge by a distance that is shorter than the diameter of the lead wire, and the lead wire opening having a vertical distance shorter than the diameter of the lead wire.

2. The housing of claim 1, wherein the rolled upper edge is part of a u-shaped indentation in the lid that forms part of the housing.

3. The housing of claim 2, wherein the rolled lower edge is part of a u-shaped indentation in the can that is connected to the lid to form the housing.

4. A housing for a ballast, comprising:
   a plastic lid having a lid end panel and a snap tab, the lid end panel including an edge having a rounded corner and a support rib;

a can having a can end panel and a snap tab opening, the can end panel including a u-shaped rolled edge aperture; and wherein the plastic lid is connected to the can so that the lid end panel overlaps the can end panel, the rounded corner and the shaped rolled edge aperture compress and provide strain relief to a lead wire passing through a lead wire window in the housing formed by the rounded corner and the u-shaped rolled edge aperture, and the snap tab is engaged by the snap tab opening.

5. The housing of claim 4, wherein the plastic lid is an injection molded plastic lid.

6. A ballast having at least one wire extending therefrom, the ballast comprising:

a lid including a lid internal portion and at least one lid wire aperture defined by a lid crease, a lid edge and a lid engaging surface extending from the lid crease to the lid edge, the lid edge being turned toward the lid internal portion; and a can including a can internal portion and at least one can wire aperture defined by a can crease, a can edge and a can engaging surface extending from the can crease to the can edge, the can edge being turned toward the can internal portion.

7. The ballast of claim 6, wherein the at least one lid wire aperture is vertically and horizontally offset with respect to the at least one can wire aperture when the lid is positioned on the can, the at least one lid wire aperture and at least one can wire aperture applying a compressive force to the at least one wire positioned in the apertures.

8. The ballast of claim 6, wherein the lid and can comprise a metal.

9. The ballast of claim 6, wherein the wire apertures are arcuate in shape.

10. The ballast of claim 6, wherein:

the can includes a can wall and the can edge is turned toward the can wall.

11. The ballast of claim 6, wherein the engaging surfaces are in direct contact with the at least one wire.

12. The ballast of claim 6, wherein:

the at least one wire includes a thickness;

the at least one lid wire aperture and the at least one can wire aperture are separated by a vertical distance and a horizontal distance; and the vertical distance is less than the thickness.

13. The ballast of claim 12, wherein the horizontal distance is less than the thickness.

14. A ballast having at least one wire extending therefrom, the ballast comprising:

a top including at least one top wire aperture defined by a first curved engaging surface;

a container including at least one container wire aperture defined by a second curved engaging surface; and wherein the at least one top wire aperture is vertically and horizontally offset with respect to the at least one container wire aperture when the top is positioned on the container so that the first and second curved engaging surfaces apply a compressive force to the at least one wire positioned in the apertures.

15. The ballast of claim 14, wherein the engaging surfaces are in direct contact with the at least one wire.

16. The ballast of claim 14, wherein:

the at least one wire includes a thickness;

the first and second curved engaging surfaces are separated by a vertical distance and a horizontal distance; and the vertical distance is less than the thickness.

17. The ballast of claim 16, wherein the horizontal distance is less than the thickness.

18. The ballast of claim 16, wherein the top is composed of plastic and includes at least one biasing closure and at least one support rib positioned proximate to the at least one top wire aperture.

19. The ballast of claim 18, wherein the container includes at least one closure opening positioned to accept the at least one biasing closure to secure the top to the container.

20. A ballast having at least one wire extending therefrom, the ballast comprising:

a top including a top internal portion and at least one top wire aperture defined by a top crease, a top edge and a first curved engaging surface extending from the top crease to the top edge, the top edge being turned toward the top internal portion;

a container including a container internal portion and at least one container wire aperture defined by a container crease, a container edge and a second curved engaging surface extending from the container crease to the container edge, the container edge being turned toward the container internal portion; and wherein the at least one top wire aperture is vertically and horizontally offset with respect to the at least one container wire aperture when the top is positioned on the container and the first curved engaging surface and the second curved engaging surface are in direct contact with the at least one wire to apply a compressive force to the at least one wire positioned in the apertures.

21. The ballast of claim 20, wherein:

the at least one wire includes a thickness;

the at least one top wire aperture and the at least one container wire aperture are separated by a vertical distance and a horizontal distance; and the vertical distance is less than the thickness.

22. The ballast of claim 21, wherein the horizontal distance is less than the thickness.

* * * * *